Patented Feb. 27, 1945

2,370,266

UNITED STATES PATENT OFFICE 2,370,266

PROTEIN PRODUCT AND PROCESS FOR MAKING SAME

Allan K. Smith, Herbert J. Max, and Donald H. Wheeler, Urbana, Ill., assignors to Claude R. Wickard, as Secretary of Agriculture of the United States of America, and his successors in office No Drawing. Application July 29, 1941, Serial No. 404,530

8 Claims. (Cl. 117—156)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes, without the payment to us of any royalty thereon.

In the industrial utilization of protein there are several properties which are of primary importance, such as color, adhesive strength, viscosity, plasticity, and dispersibility. In the specialized field of paper coatings two of the most important properties are color and adhesive strength. For high grade paper coatings casein is used more than any other protein because, in addition to having very good adhesive strength, it approaches more nearly to a white color than other commercial proteins which has been used for this purpose. Soybean protein is used to a limited extent for paper coating, but its general acceptance for this application has been prevented by its dark color.

The present invention has to do with a soybean protein which is much lighter in color than any prepared heretofore and for this reason is especially suited to fulfill the need for a cheaper adhesive in the paper coating industry and also for protein plastics and wherever a light colored protein is required.

This invention is applicable, also, to other proteins. While casein is considered a light-colored protein for paper coating, it is possible to give it a still brighter color by use of this invention. This invention also bleaches such proteins as peanut protein, cottonseed protein, and linseed or flaxseed protein.

In using this invention the bleaching action may be accomplished during the process of preparing or refining the protein, or subsequent to the regular protein preparation and during the preparation of a paper coating or protein plastic.

The following is a description of the way in which the above invention may be employed. The details thus described are illustrative embodiments of the invention and are only indicative of the various ways in which the invention may be employed.

In proceeding in accordance with our invention a seed material, such as soybean meal, for example, may be employed. The protein is extracted from the seed material with alkaline salts, alkalies, water, or acids according to well-known methods, and the undispersible matter is removed by filtering, centrifuging, or settling. The bleaching agent which is sodium dithionite, zinc dithionite, or any of the dithionite salts or dithionous acid, is added to the dispersed protein. The protein is then precipitated, and if the protein has been dispersed in alkali, it may be precipitated by adding acid until the pH reaches the isoelectric point. In the case of soybean protein, it will be precipitated at a pH between 3.9 and 5.0. Part of the acid of precipitation is supplied by decomposition of the dithionite so that less acid is required for precipitation than when the protein is prepared by ordinary acid precipitation.

The protein is then separated from the supernatant solution by filtering, centrifuging, or by other convenient methods, and dried. The protein thus prepared will be much lighter in color than any prepared heretofore, owing to the bleaching action of the dithionite.

The improved color of the protein is, to a certain degree, dependent on the proportion of bleaching agent used. Very small amounts, such as 0.25 percent of the weight of the protein solution, will give an improved product, but a still better result is obtained by using higher concentration of 1, 2, or 3 percent of sodium dithionite.

Sodium dithionite is a powerful reducing agent and has been assigned the formula of $Na_2S_2O_4$. Dithionous acid is also known by the names of hydrosulfurous or hyposulfurous acid and the sodium salts are known by the name of sodium hydrosulfite.

The improvement in the color of the protein is easily distinguishable by visual observation, and it can be further demonstrated by using it in combination with clay to prepare a paper coating and measuring the increased brightness, lightness, or whiteness of the paper coating due to the bleaching action of the sodium dithionite on the protein. The brightness of the paper coating is measured on any one of several testing machines which are used by the paper-trade for this purpose. These testing machines compare the whiteness of the paper coating to a natural standard which may be magnesium oxide or magnesium carbonate and have assigned brightness scale values of about 99 to 100.

An instrument known as the General Electric reflection meter has been used to measure the brightness of the paper coatings in the following illustrations:

The paper coating prepared for purposes of demonstration contained protein and clay in the ratio of 12 grams of protein and 80 grams of Columbia coating clay. The protein was dispersed in sodium hydroxide, and the coating was made according to known procedures.

The results of the bleaching action of the sodium and zinc salts of hydrosulfite were as follows:

| | Units |
|---|---|
| Soybean protein, unbleached | 76.4 |
| Soybean protein, bleached with sodium hydrosulfite | 78.4 |
| Soybean protein, bleached with zinc hydrosulfite | 79.2 |

In another sample, the protein remained in solution for 17 hours in 0.2 percent solution of sodium hydroxide at room temperature before precipitation with acid and the sodium dithionite was used at 1 percent concentration. The paper coating prepared from this protein had a brightness reading of 79.5 units.

Other methods of bleaching the protein are also possible. For example, if the protein has been prepared in the ordinary way and without the use of dithionite, it may be bleached during its incorporation into a paper coating formula. During the dispersion of the protein by alkalies in making up a paper coating color, the dithionite may be added to the protein dispersion and the bleaching action accomplished.

In making up coating colors using commercial soybean protein and the formula described above and using various amount of sodium dithionite, the brightness readings on the General Electric reflection meter of the paper coating were as follows:

| Quantity of sodium hydrosulfite | Brightness readings |
|---|---|
| Grams | Units |
| None | 78.4 |
| 0.25 | 78.9 |
| 1.00 | 79.6 |
| 2.00 | 80.1 |

In another example, the soybean protein was prepared from solvent-extracted meal by dispersing the protein in water, removing the undispersed part of the meal with a centrifuge, precipitating the protein at a pH of 4.5, and drying the protein curd at about 50° C. The coated paper made from this protein and using the formula described above had a brightness of 76.4 without using the sodium dithionite, with 0.5 grams of sodium dithionite, its brightness was 77.9, and with 1.0 gram of bleaching agent, 79.2.

In an example using casein as the paper coating adhesive and with the same formula as above, the brightness of the unbleached product was 78.4 units. By adding 1.0 grams of sodium dithionite to the formula, the brightness reading was 81.2.

In another series of tests the brightness was determined on another General Electric reflection meter and by a different operator. The tests were also made before and after calendering the sheets, the sheets going through the calender four times. The method of bleaching the coating color or protein was to add 1 gram of sodium dithionite to the protein in the formula described above at the time of making up the coating color. The readings, showing increase in brightness of the coatings, are as follows: The data represent the average values obtained from readings on two or more sheets.

| | Uncalendered | Calendered |
|---|---|---|
| Casein, unbleached | 76.0 | 72.8 |
| Casein, bleached | 78.8 | 75.4 |
| Commercial soybean protein, unbleached | 75.6 | 71.3 |
| Commercial soybean protein, bleached | 78.0 | 75.3 |
| Unhydrolyzed soybean protein, unbleached | 74.3 | 70.9 |
| Unhydrolyzed soybean protein, bleached | 76.5 | 73.2 |

The above procedure is merely illustrative of the various methods of using sodium dithionite or other salts or acids of dithionite for preparing light colored proteins and paper coatings. Other modes of applying the principle of the invention may be employed, change being made as regards the details described to suit the immediate conditions of protein refinement and purification which are well known to the art.

Having thus described our invention, what we claim for Letters Patent is:

We claim:

1. A paper coated with a composition comprising an alkali dispersion of clay and a refined protein material treated with a dithionite salt.

2. A paper coated with a composition comprising clay admixed with the precipitant of an alkali dispersion of a protein material treated with a dithionite salt and an acid.

3. A paper coated with a composition comprising clay and a refined protein material which has been treated in an alkali dispersion with a dithionite salt.

4. A paper coated with a composition comprising an alkali dispersion of clay and a refined protein material treated with zinc dithionite.

5. A paper coated with a composition comprising an alkali dispersion of clay and a refined protein material treated with sodium dithionite.

6. A paper coated with a composition comprising an alkali dispersion of clay and a refined soybean protein material treated with zinc dithionite.

7. A paper coated with a composition comprising an alkali dispersion of clay and a refined soybean protein material treated with sodium dithionite.

8. A paper coated with a composition comprising an alkali dispersion of clay and casein treated with a dithionite salt.

ALLAN K. SMITH.
HERBERT J. MAX.
DONALD H. WHEELER.